(12) United States Patent
Goto

(10) Patent No.: US 7,727,009 B2
(45) Date of Patent: *Jun. 1, 2010

(54) PANEL MOUNT LIGHT EMITTING ELEMENT ASSEMBLY

(75) Inventor: Kazuhiro Goto, Markham (CA)

(73) Assignee: Tyco Electronics Canada ULC, Markham, Ontario (CA)

( * ) Notice: Subject to any disclaimer, the term of this patent is extended or adjusted under 35 U.S.C. 154(b) by 293 days.

This patent is subject to a terminal disclaimer.

(21) Appl. No.: 11/832,053

(22) Filed: Aug. 1, 2007

(65) Prior Publication Data

US 2008/0198606 A1    Aug. 21, 2008

Related U.S. Application Data

(60) Provisional application No. 60/901,394, filed on Feb. 15, 2007.

(51) Int. Cl.
   *H02B 1/01* (2006.01)
(52) U.S. Cl. .................. 439/552; 439/548; 362/396
(58) Field of Classification Search .............. 362/433, 362/548, 396, 435, 436, 364, 365, 490, 147; 439/544, 548, 549, 550, 552–559
See application file for complete search history.

(56) References Cited

U.S. PATENT DOCUMENTS

| 3,641,481 | A | | 2/1972 | Farrell | |
|---|---|---|---|---|---|
| 5,068,771 | A | * | 11/1991 | Savage, Jr. | 362/255 |
| 5,821,695 | A | * | 10/1998 | Vilanilam et al. | 315/58 |

OTHER PUBLICATIONS

Hardardt A T et al: "Plastic Component Housing" IBM Technical Disclosure Bulletin, IBM Corp. NewYork, US, vol. 5, No. 2, Jul. 1, 1962 p. 46, XP001363781.

International Search Report, International Application No. PCT/US2008/001916, International Filing Date Feb. 13, 2008.

* cited by examiner

*Primary Examiner*—Gunyoung T Lee

(57) ABSTRACT

A light emitting element assembly for mounting to a panel. The assembly includes a housing configured to receive a light emitting element therein. In addition, the assembly includes a bezel having at least one latch arm extending from a surface of the bezel, wherein the bezel is configured to detachably engage a surface within the housing. The bezel is further configured to retain the assembly in a position relative to the panel. The assembly also includes a mounting structure having the light emitting element operably mounted therein.

19 Claims, 9 Drawing Sheets

PANEL MOUNT LIGHT EMITTING ELEMENT ASSEMBLY

FIELD OF THE INVENTION

The disclosure relates generally to light emitting assemblies and system, and more particularly, the disclosure relates to a panel mounted light emitting element, assembly and system.

BACKGROUND OF THE INVENTION

Recent technological advances in low voltage light sources, such as light emitting diodes (LEDs), now present low voltage light sources as suitable candidates as light sources. Low voltage light sources operate at a small fraction of the electrical power of conventionally used light sources and are an attractive option due to generally lower cost and higher efficiency than conventionally used light sources.

A specific use of an LED based light may be a small pin light emitting element assembly for spot illumination. These pin spot lights may be panel mounted for directing the illumination. In some proposed applications, the entire pin spot light assembly must be sufficiently small to fit in restricted spaces. Additionally, the light emitting assemblies must be accessible for repair or replacement. Conventional designs provide the latches outside of the lamp housing. This makes the overall size of the bezel used to mount the lamp assembly to the panel very large. The bulky external latch configurations make the assembly less pleasing aesthetically and also make it difficult to package the light emitting assemblies in extremely tight locations. The minimization of space occupied by these light emitting assemblies is often an issue with applications, such as automotive interior lighting.

What is needed is a light emitting element assembly and system that is capable of being mounted in areas having restricted space and also being capable of easy installation and disassembly for repair, replace and/or upgrade individual components of the assembly.

SUMMARY OF THE INVENTION

One aspect of the present disclosure includes a light emitting element assembly for mounting to a panel. The assembly includes a housing configured to receive a light emitting element therein. In addition, the assembly includes a bezel having at least one latch arm extending from a surface of the bezel, wherein the bezel is configured to detachably engage a surface within the housing. The bezel is further configured to retain the assembly in a position relative to the panel. The assembly also includes a mounting structure having the light emitting element operably mounted therein.

Another aspect of the present disclosure includes a light emitting element assembly system having a panel with an opening and a light emitting device. The assembly includes a housing configured to receive a light emitting element therein. In addition, the assembly includes a bezel having at least one latch arm extending from a surface of the bezel, wherein the bezel is configured to detachably engage a surface within the housing. The bezel is further configured to retain the assembly in a position relative to the panel. The assembly also includes a mounting structure having the light emitting element operably mounted therein.

Embodiments of the present disclosure include panel mounted light emitting assemblies having an internally mounted bezel. The internally mounted bezel allows mounting structures of reduced size, and thus, a smaller overall light emitting element assembly size.

In addition, the detachable bezel permits easy installation of the light emitting element assembly and easy disassembly for repair, replacement or upgrade of individual components of the light emitting element assembly.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
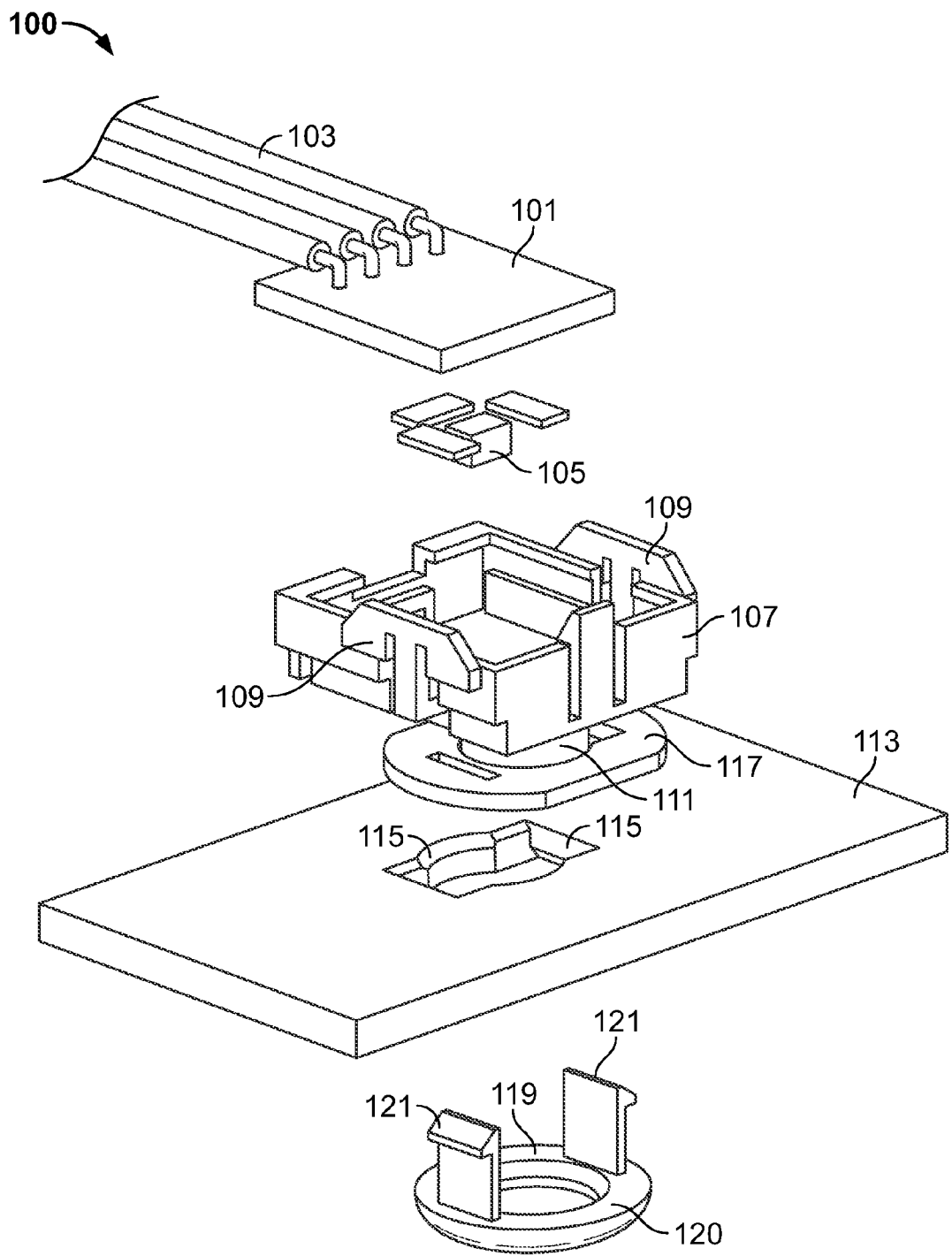
FIG. 1 shows an exploded perspective view of an exemplary embodiment of a light emitting element assembly according to an embodiment of the disclosure.

FIG. 1 shows an exploded view of a panel mounted light emitting element assembly 100 according to an embodiment of the present disclosure. The assembly 100 includes a mounting board 101 having wires 103 in electrical communication therewith. Light emitting elements 105 may include any devices capable of providing illumination. Suitable light emitting elements 105 may include any light emitting elements 105 known for providing illumination, such as, but not limited to, light emitting diodes (LEDs), laser diodes, organic light emitting diodes (OLEDs), incandescent lights, fluorescent lights, polymer light emitting diodes, emissive phosphor lights and electroluminescent lights. Mounting board 101 may be any device, surface, structure or substrate capable of supporting, controlling and/or providing power to light emitting elements 105. Suitable structures for use as mounting board 101 includes, but is not limited to printed circuit boards (PCB). In addition, wires 103 may be any configuration of wires or other power supplies. The source of power for the light emitting elements 105 is not limited to wired power, but may include batteries, photovoltaic cells or other power sources, which may or may not include wires 103. Housing 107 is configured to receive the mounting board 101 and the light emitting element 105. The housing 107 further includes flexible cantilevered legs 109 extending along distal ends of housing 107. The housing 107 may be fabricated from any suitable material, including electrically insulative polymeric material, such as acrylonitrile butadiene styrene (ABS) or other similar polymeric materials. The housing 107 further includes a lens portion 111 extending from the body of the housing. The lens portion 111 includes a substantially transparent, translucent or otherwise light distributing or dispersing material. Suitable material for the lens portion 111, includes, but is not limited to, transparent polymer, such as acrylic or polycarbonate.

The panel 113 includes an opening 115, which is disposed therethrough. The panel 113 is any surface, structure or substrate onto which a light emitting assembly 100 may be mounted. For example, the panel 113 may include a polymeric or other material sheet wherein lighting is desired on one side of the panel 113, wherein space is limited and the majority of the light emitting element structure, such as the housing 107, the mounting board 101 and the light emitting element 105, is disposed on the opposite side of the panel 105. Disposed between the housing 107 and a panel 113 is a gasket 117. While the assembly 100 is shown including gasket 117, the gasket may be omitted in certain embodiments of the disclosure. The gasket 117 may be fabricated from foam or other insulative material and provides sealing, shock/vibration resistance and/or protects the housing 107 and panel 113, particularly during installation and disassembly of the assembly 100. The assembly 100 further includes a bezel 119 having a display surface or face plate 120 and two latch arms 121 extending therefrom. The latch arms 121 are flexible cantilevered latches configured to pass through opening 115 and detachably engage a surface within housing 107. When engaged with housing 107, the bezel 119 rests against or adjacent to panel 113, wherein the engagement retains the assembly 100 in position with respect to panel 100. In other words, the latch arms 121 engage housing 107, wherein the engagement of the latch arms 121 with housing 107 provides an engagement between bezel 119 and panel 113, wherein the bezel 119 retains the positioning of the assembly 100. In one embodiment of the present disclosure, as shown in FIG. 1, bezel 119 includes a double beam latch. However, the present disclosure is not so limited and may include any latch arm 121 structure capable of extending through opening 115 and engaging housing 107.

Figure 2:
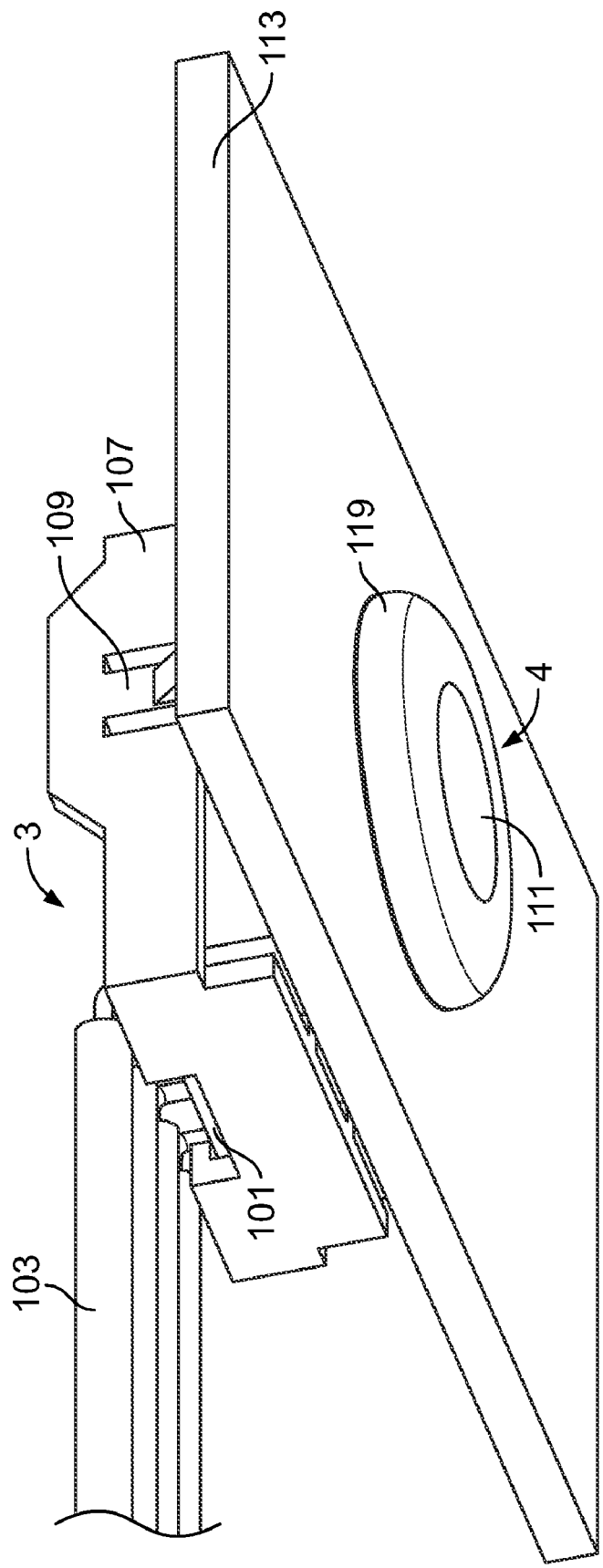
FIG. 2 shows a perspective view of an exemplary embodiment of a light emitting element assembly of the present disclosure mounted to a panel.

FIG. 2 shows a bottom perspective view of an assembly 100 according to an embodiment of the disclosure mounted on a panel 113. As shown in FIG. 2, the bezel 119 is engaged with housing 107 through opening 115 (not visible in FIG. 2) of panel 113. The engagement of bezel 119 with housing 107 maintains the relative positioning of the assembly 100 with respect to the panel 113. During operation, the light emitting element 105 provides illumination wherein the lens portion 111 transmits or otherwise distributes the resultant light in a desired manner.

Figure 3:
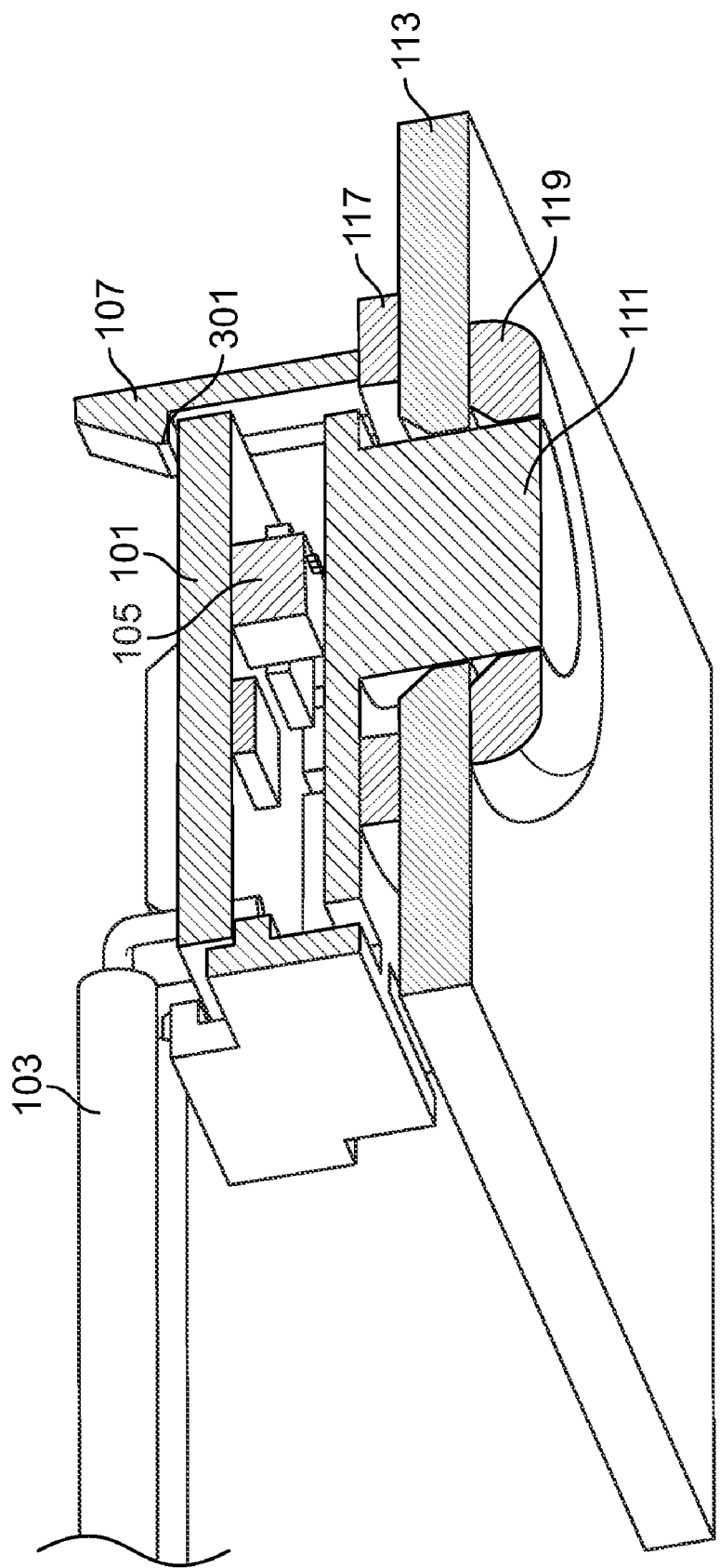
FIG. 3 is a cross-section of the light emitting element assembly taken along line 3-3 of FIG. 2.

FIG. 3 shows a cutaway view taken along line 3-3 of FIG. 2. As shown in FIG. 3, the mounting board 101 is engaged with housing 107. The housing 107 may include features 301 to secure the mounting board 101 with the light emitting element 105 facing downward in a direction toward housing 107. The mounting board 101 may be engaged or otherwise attached to housing 107 in any suitable manner known in the art. For example, although FIG. 2 shows a mechanical interlocking arrangement, the mounting board 101 may be affixed to housing 107 by adhesive, latches, or any other known method known for engaging PCB structures to housings 107. In addition, the positioning of light emitting element 105 is in sufficient proximity to the lens portion 111 to provide a high efficiency of light distribution into the desired locations.

Figure 4:
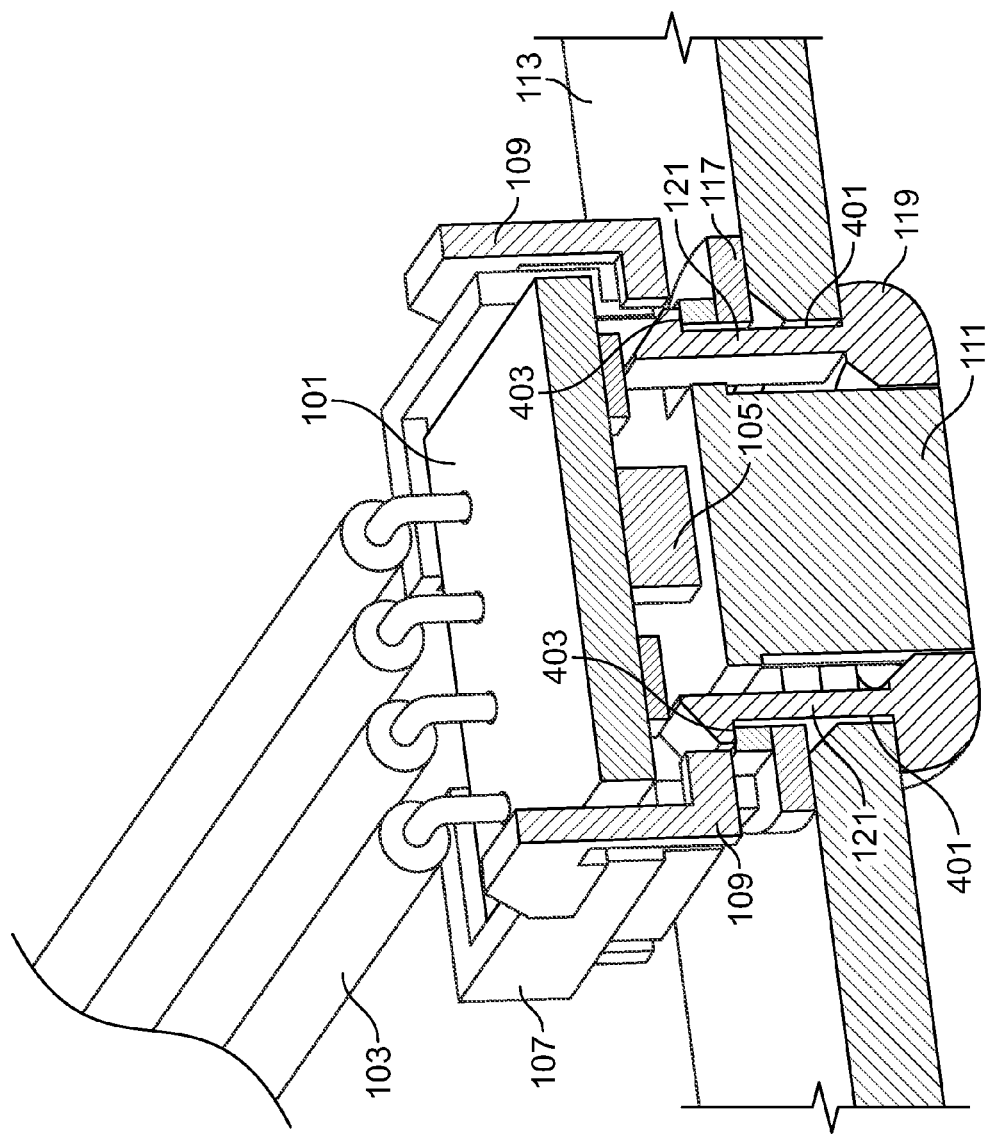
FIG. 4 is a cross-section of the light emitting element assembly taken along line 4-4 of FIG. 2.

FIG. 4 shows a cutaway view taken along line 4-4 of FIG. 2. The latch arms 121 of bezel 119 extend through slots 401 in housing 107 and engaged a surface 403. As shown in FIG. 4, legs 109 are arranged adjacent or in proximity to latch arms 121 of bezel 119. In order to disengage bezel 119 from the housing 107, the legs 109 may be depressed inwardly for a sufficient distance to disengage the latch arms 121 from surface 403. Upon disengagement, bezel 119 may be removed via slot 401. Once the bezel 119 has been removed, the assembly 100 may be removed from panel 113 and/or disassembled for repair, replacement and/or upgrade of individual components.

Figure 5:
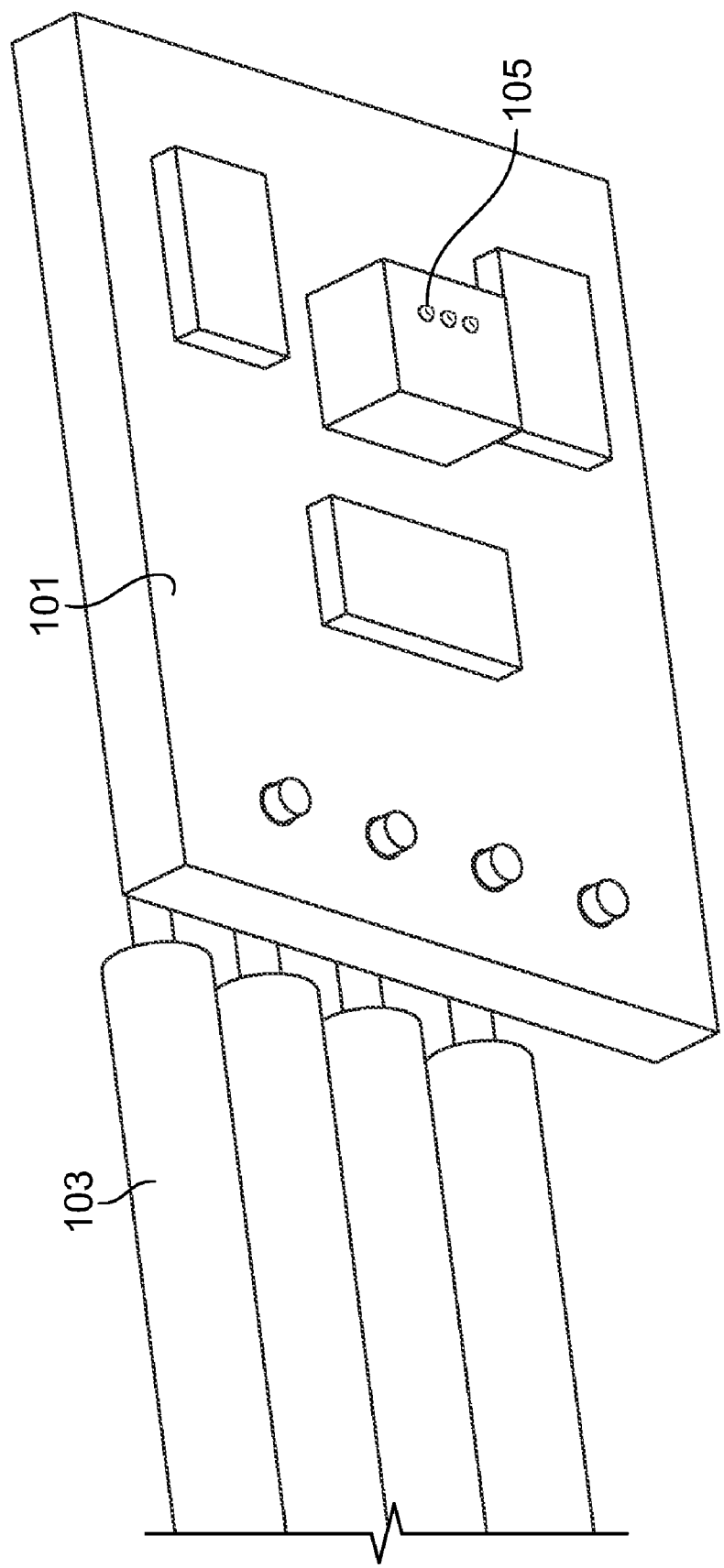
FIG. 5 is a perspective view of the PCB assembly of the light emitting element assembly of FIG. 2.

FIG. 5 shows a bottom perspective view of mounting board 101. Mounting board 101 may be any device, surface, structure or substrate capable of supporting, controlling and/or providing power to light emitting elements 105. Suitable structures for use as mounting board 101 includes, but is not limited to printed circuit boards (PCB). Mounting board 101 may include a PCB assembly having a light emitting element 105, such as an LED and corresponding electronic components such as resistors and capacitors (not shown) soldered onto mounting board. A set of wires 103 may also be soldered onto the mounting board 101 to power the electronic components so that the light is emitted from the light emitting element 105. However, the source of power for the light emitting elements 105 is not limited to wired power, but may include batteries, photovoltaic cells or other power sources, which may or may not include wires 103.

Figure 6:
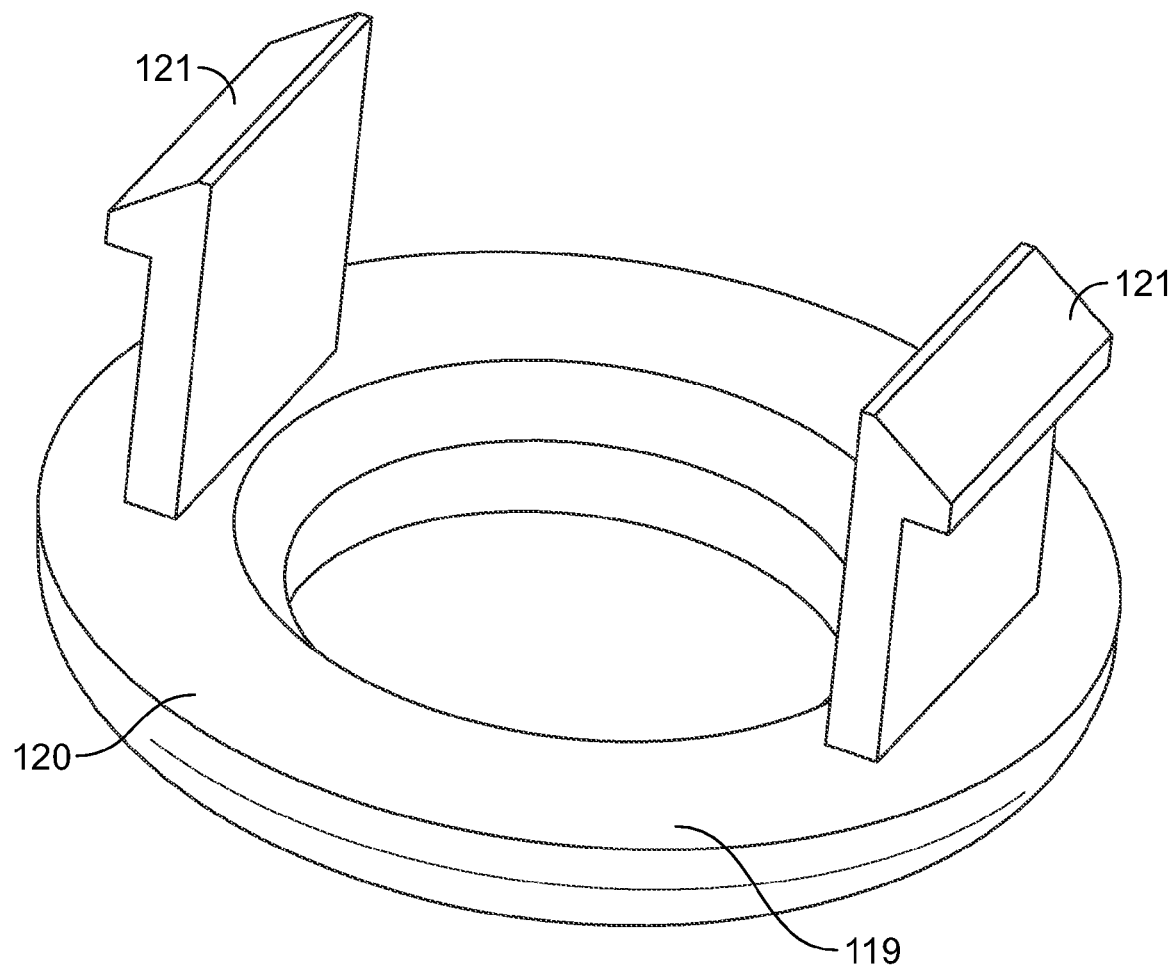
FIG. 6 is a perspective view of an exemplary embodiment of the bezel of the light emitting element assembly of FIG. 2.

FIG. 6 shows bezel 119 having latch arms 121. As discussed above, latch arms 121 are configured to engage housing 107, wherein the latch arms 121 may be inserted into slots 401 (see FIG. 4 and FIG. 7) and engage surface 403 of housing 107. In addition, the bezel 119 may include aesthetically desirable features, such as curved or decorative surfaces that are visible when the bezel 119 is engaged to trim the lens portion 111 in addition to securing the assembly 100 onto the panel 113.

Figure 7:
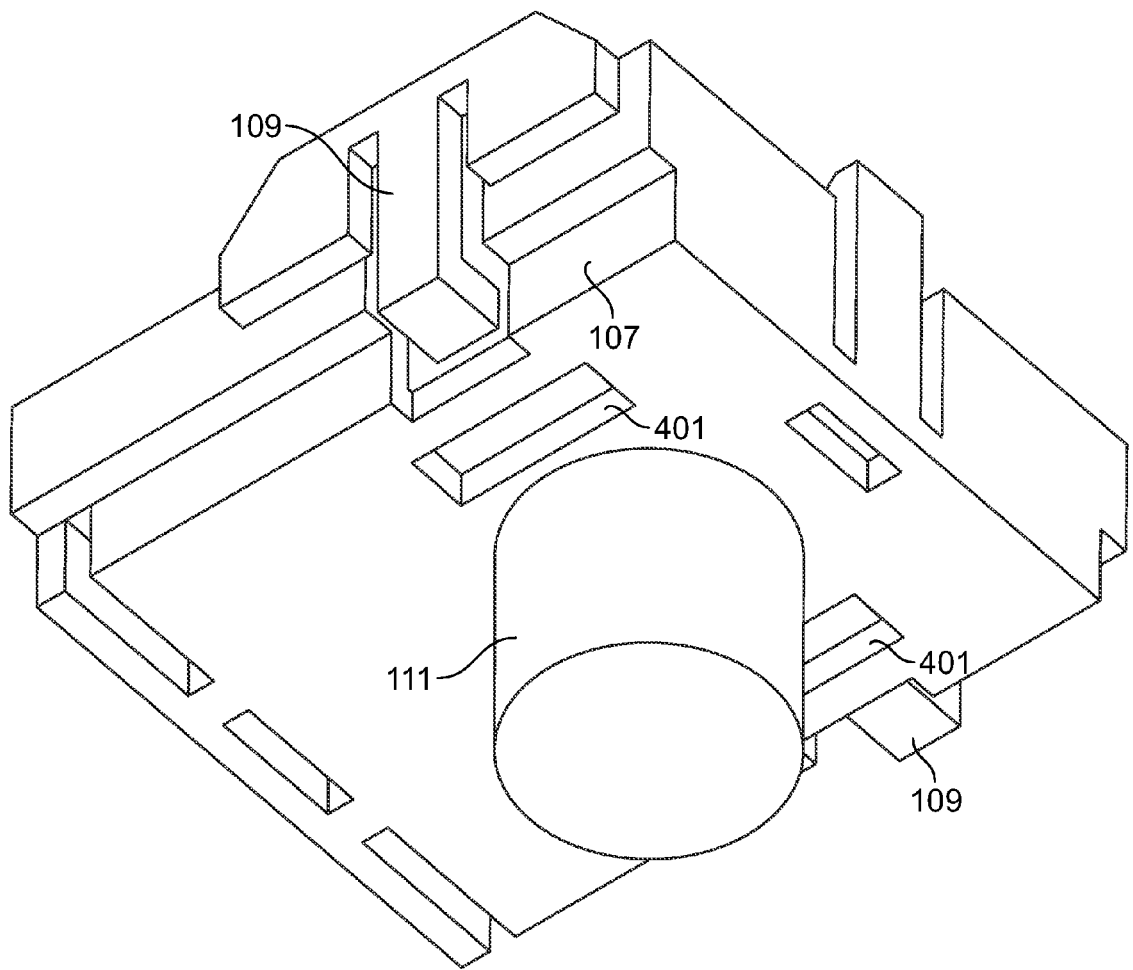
FIG. 7 is a perspective view of a housing of the light emitting element assembly of FIG. 2.

FIG. 7 shows a perspective view from below housing 107. Housing 107 is preferably made of a polymeric material. The housing 107 further includes a lens portion 111, which is preferably fabricated from a clear polymer, such as, but not limited to, acrylic or polycarbonate. When these components are snapped together, the latch arms 121 engage housing 107 securing the housing 107 and permitting the exposure of the lens portion 111 to the space in which illumination is desired. The lens portion 111 distributes the light emitted by the light emitting element 105. In one embodiment, the lens portion is transparent and the light of the light emitting element 105 is permitted to travel through the lens portion substantially unaltered. The lens portion 111 may also be hollowed out to create yet different light patterns. The lens potion 111 may include optical features, filters or other effects that may be desirable for the particular lighting application. In addition, the surface of the lens portion 111 can be angled or made prismatic, so that various light distribution can be achieved by making simple changes to the housing 107.

Figure 8:
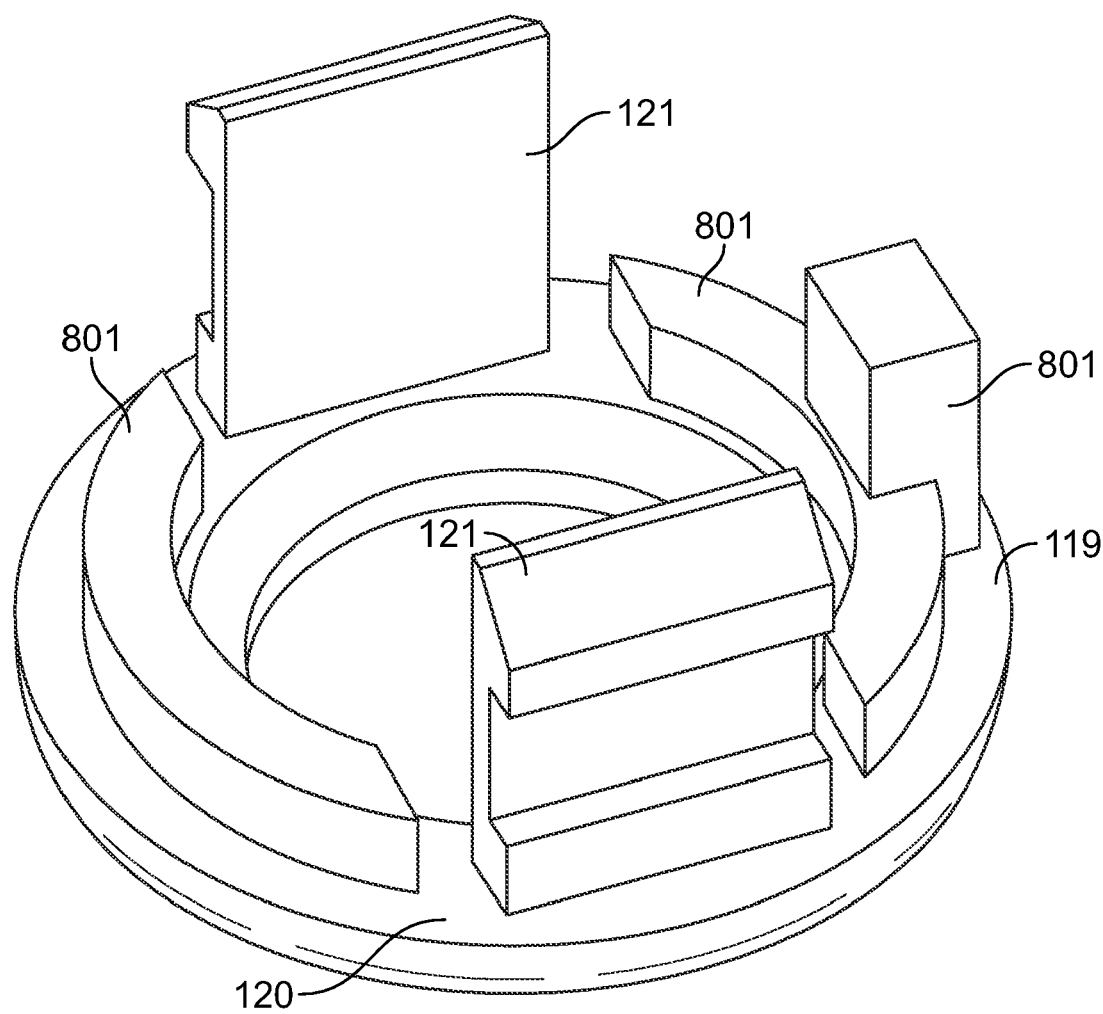
FIG. 8 is a perspective view of a bezel according to an alternate embodiment.

FIG. 8 shows a perspective view of a bezel 119 according to an alternate embodiment. As shown and describe above with respect to FIG. 6, bezel 119 includes latch arms 121. Latch arms 121 are configured to engage housing 107, wherein the latch arms 121 may be inserted into and engage a portion of housing 107 (see e.g., FIG. 4). In addition, the latch arms 121, the bezel 119, as shown in FIG. 8, includes positioning features 801, which extend from the bezel faceplate 120 and provide a geometry to facilitate desired positioning of the bezel with respect to the panel 113 and housing 107.

Figure 9:
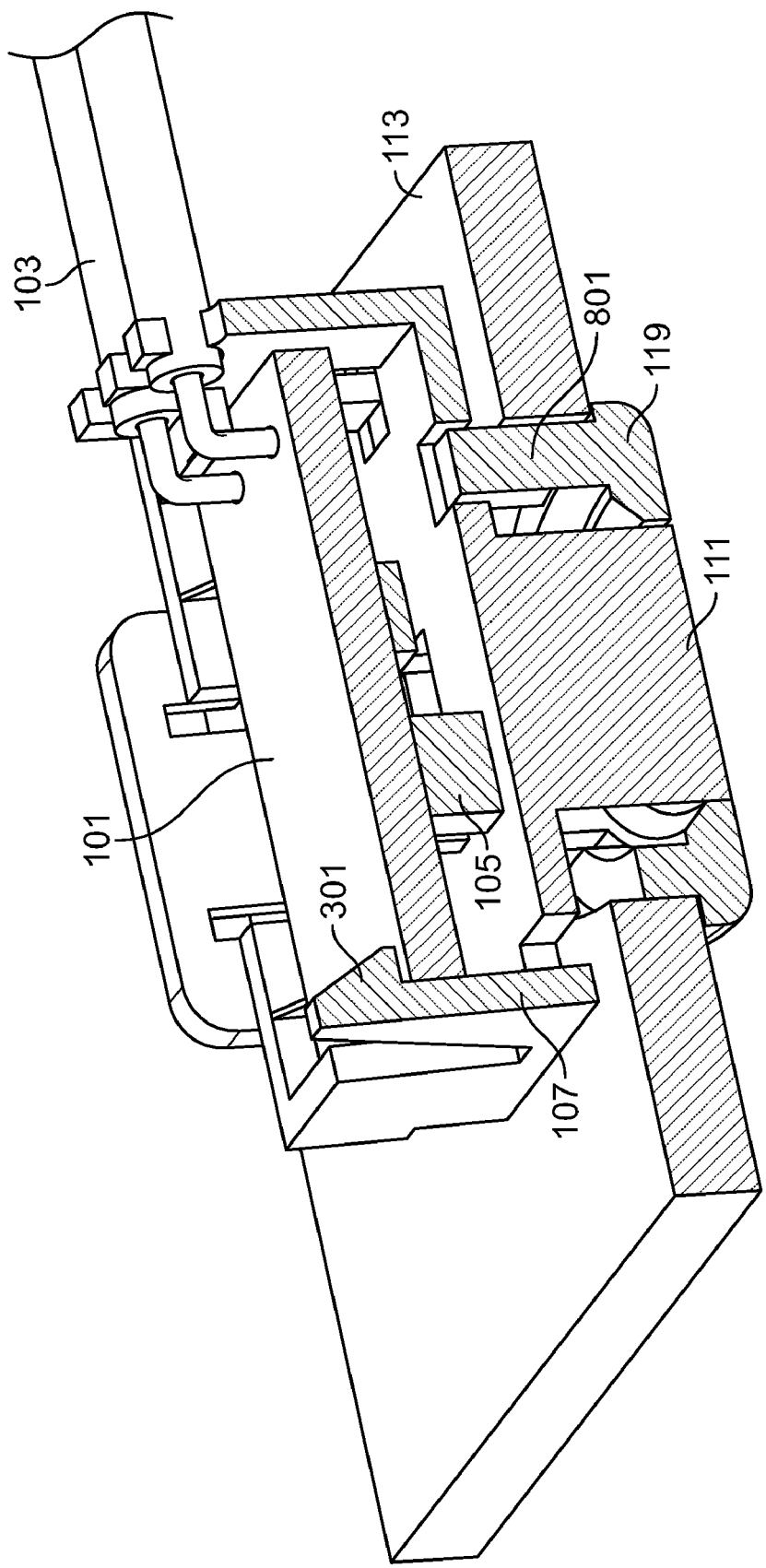
FIG. 9 is a cross-section of the light emitting element assembly including the bezel of FIG. 8.

FIG. 9 shows a cutaway view of an alternate embodiment of the invention having the alternate bezel structure shown and described above with respect to FIG. 3. Specifically, FIG. 9 shows the mounting board 101 is engaged with housing 107. The housing 107 may include features 301 to secure the mounting board 101 with the light emitting element 105 facing downward in a direction toward housing 107. The mounting board 101 may be engaged or otherwise attached to housing 107 in any suitable manner known in the art. In addition, the positioning of light emitting element 105 is in sufficient proximity to the lens portion 111 to provide a high efficiency of light distribution into the desired locations. In addition, the bezel 119 shown in FIG. 9 includes positioning features 801. Positioning features 801, which extend from the bezel faceplate 120 and provide a geometry to facilitate proper positioning of the bezel with respect to the panel 113 and housing 107. In addition, the geometry of positioning features 801 mate or otherwise are inserted into corresponding geometries in the panel 113 and/or housing 107 to prevent rotation or undesired movement or disengagement.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A light emitting element assembly system comprising:
   a panel comprising an opening;
   a light emitting element assembly comprising:
      a housing configured to receive a light emitting element therein, the housing comprising at least one flexible cantilevered leg;
      a bezel comprising at least one latch arm extending from a surface of the bezel configured to detachably engage a surface within the housing, the bezel further being configured to extend through the opening retain the assembly in a position relative to the panel;
      the at least one flexible cantilevered leg configured to disengage the at least one latch arm from the housing, such that when the at least one cantilevered leg is engaged, the at least one latch arm is moved out of engagement with the housing and the bezel is sufficiently disengaged to allow removal; and
      a mounting structure comprising the light emitting element operably mounted on the mounting structure.

2. The system of claim 1, further comprising a gasket disposed between the panel and the housing.

3. The system of claim 1, wherein the housing further comprises a lens portion arranged and disposed to distribute light from the light emitting element.

4. The system of claim 1, wherein the housing further comprises one or more slots configured to receive the latch arms.

5. The system of claim 4, wherein the latch arms are aligned with the housing slot such that insertion through an opening in the panel provides engagement with the housing.

6. The system of claim 4, wherein the one or more flexible cantilevered legs is in proximity to the latch arm and arranged such that when the flexible cantilevered leg is depressed inward, the latch arm is moved out of engagement with the slot and the bezel is sufficiently disengaged to allow removal.

7. The system of claim 1, wherein the lens portion is angled.

8. A light emitting element assembly for mounting to a panel, comprising:
   a housing configured to receive a light emitting element therein, the housing comprising at least one flexible cantilevered leg;
   a bezel comprising at least one latch arm extending from a surface of the bezel configured to detachably engage a surface within the housing, the latch arm being engaged with the surface of the housing as the surface of the bezel is provided in engagement with a surface of the panel, the bezel further being configured to retain the assembly in a position relative to the panel;
   the at least one flexible cantilevered leg configured to disengage the at least one latch arm from the housing, such that when the at least one cantilevered leg is engaged, the at least one latch arm is moved out of engagement with the housing and the bezel is sufficiently disengaged to allow removal; and
   a mounting structure comprising the light emitting element operably mounted on the mounting structure.

9. The assembly of claim 8, further comprising a gasket disposed between the panel and the housing.

10. The assembly of claim 8, wherein the housing further comprises a lens portion arranged and disposed to distribute light from the light emitting element.

11. The assembly of claim 8, wherein the housing comprises one or more flexible cantilevered legs configured to selectively disengage the at least one latch arm from the housing.

12. The assembly of claim 11, wherein the housing further comprises one or more slots configured to receive the at least one latch arm.

13. The assembly of claim 12, wherein the at least one latch arm is aligned with the housing slot such that insertion through an opening in the panel provides engagement with the housing.

14. The assembly of claim 13, wherein the one or more flexible cantilevered legs is in proximity to the latch arm and arranged such that when the flexible cantilevered leg is depressed inward, the latch arm is moved out of engagement with the slot and the bezel is sufficiently disengaged to allow removal.

15. The assembly of claim 10, wherein the lens portion is angled.

16. The assembly of claim 8, wherein the light emitting element is a light emitting diode or an organic light emitting diode.

17. The assembly of claim 8, wherein the light emitting element is a printed circuit board with a light emitting diode disposed on the printed circuit board.

18. The assembly of claim 8, wherein the bezel further comprises positioning features.

19. The assembly of claim 18, wherein the positioning features are configured to align the bezel with one or both of the housing or the panel.

* * * * *